No. 746,765. PATENTED DEC. 15, 1903.
C. E. & E. L. WARNER.
MACHINE FOR MAKING WIRE FENCES.
APPLICATION FILED JAN. 27, 1903.
NO MODEL. 10 SHEETS—SHEET 1.

No. 746,765. PATENTED DEC. 15, 1903.
C. E. & E. L. WARNER.
MACHINE FOR MAKING WIRE FENCES.
APPLICATION FILED JAN. 27, 1903.
NO MODEL. 10 SHEETS—SHEET 4.

No. 746,765. PATENTED DEC. 15, 1903.
C. E. & E. L. WARNER.
MACHINE FOR MAKING WIRE FENCES.
APPLICATION FILED JAN. 27, 1903.
NO MODEL. 10 SHEETS—SHEET 7.

No. 746,765. PATENTED DEC. 15, 1903.
C. E. & E. L. WARNER.
MACHINE FOR MAKING WIRE FENCES.
APPLICATION FILED JAN. 27, 1903.
NO MODEL. 10 SHEETS—SHEET 9.

Witnesses
E. K. Stewart
Jno. E. Parker

C. E. Warner and
E. L. Warner,
Inventors by C. A. Snow & Co.
Attorneys

No. 746,765. Patented December 15, 1903.

UNITED STATES PATENT OFFICE.

CHARLES E. WARNER AND EUGENE L. WARNER, OF WAVERLY, KANSAS.

MACHINE FOR MAKING WIRE FENCES.

SPECIFICATION forming part of Letters Patent No. 746,765, dated December 15, 1903.

Application filed January 27, 1903. Serial No. 140,761. (No model.)

*To all whom it may concern:*

Be it known that we, CHARLES E. WARNER and EUGENE L. WARNER, citizens of the United States, residing at Waverly, in the county of Coffey and State of Kansas, have invented a new and useful Machine for Making Wire Fences, of which the following is a specification.

This invention relates to certain improvements in mechanism of that class employed in the manufacture of wire fences in which the fence is composed of a plurality of longitudinal and transverse strands intertwisted at crossing-points and forming an angular mesh. The principal object of the invention is to construct a machine in which the entire operation shall be automatic, the parts being properly timed for the production of a fence of mesh of the desired size and the operation being continuous until the longitudinal strands which form the warps are exhausted.

A further object of the invention is to provide an improved looper mechanism for simultaneously forming a plurality of alining loops in the warp-wires and holding the same in proper position during the passage of a transverse or weft wire, and, further, in this connection to provide for the slackening of the tension on the longitudinal or warp wires immediately preceding or during the operation of forming the loops and for automatically taking up the slack and placing the wires under strain after the passage of the weft-wire in order to draw the loop out into the form of a knot or twist.

A still further object of the invention is to provide improved means for engaging the ends of the weft-wires after the latter are passed through the loops and twisting the same around the edge cables or selvage wires in order to properly secure the wefts in place.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Fig. 22 is a detail view of the weft-severing mechanism.

Similar characters of reference are employed to indicate corresponding parts throughout the several figures of the drawings.

The general frame of the machine may be formed of either wooden or metallic beams and comprises, essentially, sills 10, having uprights 11, each supporting an upper horizontal frame 12. The mechanism forming the subject of the invention may be employed in connection with the manufacture of fencing of any desired width and in the present instance is designed for use in the manufacture of fences having two selvage wires $x$, formed of a pair of twisted strands, five spaced intermediate strands $y$, and wefts $z$. The several selvage and intermediate warps or strands are preferably wound on separate spools and are fed to one end of the machine over a tension-board 15, having a plurality of headed studs or pins 16, these being arranged in rows and a single row being placed in alinement with each of the strands or warps. Each warp is passed around the studs of one of the rows in order that sufficient frictional resistance may be offered to an attempt to pull the warps toward the opposite end of the machine to hold the said warps under the required tension. The warps are led between a pair of beams 17 and 18, arranged adjacent to the looper mechanism, and serving in the manner hereinafter described to assist in positioning the wefts or cross-strands during the manufacture of the fence. The manufactured fence is led to the opposite end of the machine, where it passes over a barrel or roll 19, comprising two or more rings 20, mounted on suitable spokes projecting from hub members 21, carried by a transverse shaft 22. The two rings are provided with a large number of bolt-receiving openings 23 and are adapted to receive and support a number of transverse bars 24, the positions of which may be readily adjusted in accordance with the size of the mesh of the fence by passing the strip-holding bolts through the proper bolt-openings in the rings, a greater or less number of strips being employed in accordance with the length of the mesh. The strips 24 are each provided with mesh-engaging fingers 26, which bear against the weft or cross strands and in the turning movement of the drum act as feeders for effecting an intermittent longitudinal movement of the warps, the movement being stopped at regular intervals for the insertion of the wefts. The fence passes from the roll 19 to the rear and upwardly over a small roller 28, thence downwardly under a second roller 29, and finally to a reel 30 at the end of the machine and on which the manufactured fence is wound, suitable take-up mechanism being employed in connection with these devices, as will more fully appear hereinafter.

The lower beam 18, previously referred to, is provided with a longitudinally-disposed slot 31, extending from end to end of its upper face and serving, in connection with a similar slot 32 in the lower face of the upper and movable bar 17, to guide the weft-wire as it passes from one side of the machine to the other. The lower bar 18 is provided with a plurality of openings for the reception of vertically-disposed looper-bars 33 of a number equal to the number of intermediate warp-strands—five in the present instance—and each comprising a vertical bar having suitable recesses at its upper end for the reception of the warps, so that when turned the loopers may act to form small loops or twists in each of the warps for the reception of the weft.

Figures 8, 9, 10, 11, 12, 13, 14, 15:
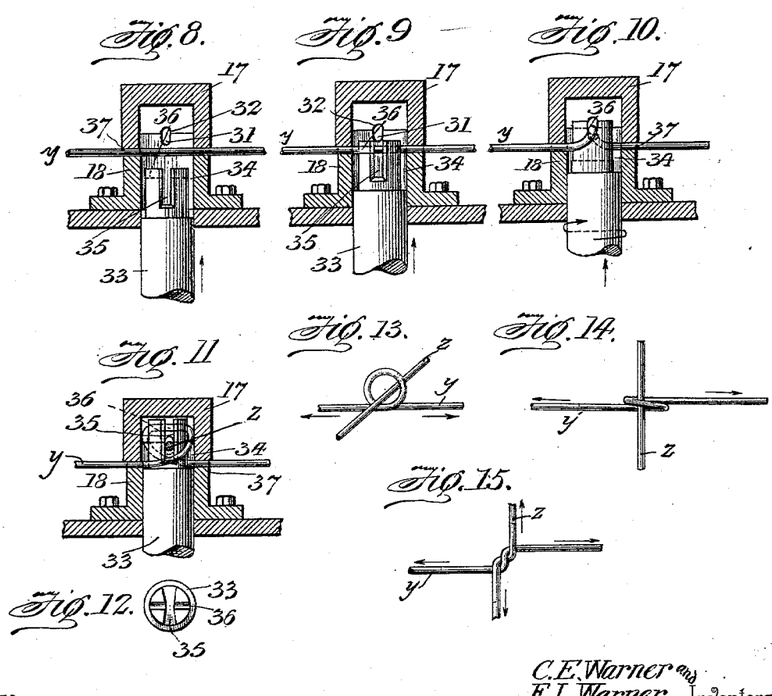
Figs. 8, 9, 10, and 11 are views in sectional elevation illustrating the construction and operation of one of the loopers.
Fig. 12 is a plan view of one of the looper-heads.
Figs. 13, 14, and 15 are views illustrating the manner in which the wire is twisted.

In the upper portion of each of the loopers are two transversely-disposed recesses 35 and 36, crossing each other at right angles, the notches or grooves 35 being of much greater depth than the grooves 36 and being adapted for the passage of the crossing or weft wire, while the shallow notch 36 receives the longitudinal or warp wire and when the looper is turned forms a loop in said warp-wire and holds the same in readiness for the passage of the weft. The construction of the looper is shown in detail in Figs. 8, 9, 10, 11, and 12, and referring to these figures it will be found that the lower bar 18 is provided with transverse notches 37 for the passage of the warp-wire $y$, and when the upper bar 17 is closed down on the warp-wire the latter will be firmly held in position and will be received within the shallow groove 36 of the looper when the latter moves upward from the lowest position shown in Fig. 8. In the operation of this portion of the mechanism, all of the intermediate warp-wires being clamped between the two bars 17 and 18, an upward movement is given to all of the looper-bars 33, and the latter move from the lowest position illustrated in Fig. 8 to that shown in Fig. 9, the warp-wires being received within the shallow recesses 36. As soon as the wires are thus engaged the looper-bars simultaneously receive rotative movement to the extent of one-half of a revolution and at the same time continue the ascending movement, as shown in Figs. 10 and 11. This movement is sufficient to form a loop of the character shown in Fig. 11, the upper portion of the loop being held by the recess and excessive upward movement of the warp-wire being prevented by contact with the lower surface of the bar 17. A clear passage is thus formed through the several grooves 35 for the reception of the weft-wire $z$, the latter being forced through the whole series of loops and each loop being substantially as shown in Figs. 13 and 14. The loopers are then depressed and restored to position, and they may be rotated in a reverse direction, if desired, or allowed to remain in the same position of circumferential adjustment, in either case being in readiness for the next operation. After the formation of the loops and the passage of the weft-wire tensional strain is exerted on the warps, and the loop is drawn out to form a knot or twist of the character shown in Fig. 15.

The lower ends of the looper-bars are supported in a transverse bar 39 and extend through guiding-openings in a secondary bar 40, arranged immediately above the bar 39 and connected thereto by a number of securing-bolts 41, the two bars serving as a means for holding pinions 33' in position on the several loopers in order that independent vertical movement of the pinions may be prevented. At the opposite ends of the lower bar 39 are studs carrying antifriction-rollers 42, adapted to slots 43 in rocker-arms 44, which are arranged near the opposite ends of a transversely-disposed rock-shaft 45, mounted in suitable bearings in brackets 46, carried by the sills 10, provision being made for imparting a rocking movement to the shaft 45 in order to effect an intermittent vertical reciprocatory movement of the bar 39 and the several loopers carried thereby.

In order to avoid the necessity of guideways for maintaining the lower ends of the loopers in proper vertical position, we employ links 47, pivoted at one end to the bar 39 and at the opposite end to fixed standards forming a part of the main frame, the length of the links being sufficient to prevent any perceptible lateral movement of the lower ends of the loopers.

In the upper portion of the frame of the machine are suitable bearings for the reception and support of a shaft 48, having at one end a driven pulley 49, receiving motion from any suitable source of power, and on said shaft is further secured a pinion 50, intermeshing with a gear-wheel 51, and a shaft 52, also mounted in bearings at the upper portion of the frame and extending parallel with the main shaft 48. On the shaft 52 is secured a cam 53, bearing against an antifriction-roller 54, mounted at the upper end of a rocking lever 55, the lower end of which is pivoted on a stud projecting from the side of one of the sills 10. The lever 55 is connected at a point intermediate of its length to a crank-arm 56 on the rock-shaft 45, an adjustable connecting-rod 51' being employed for the purpose, and this cam is of such contour as to effect a comparatively quick upward movement of the loopers at each revolution of the shaft 52, the cam holding the loopers in elevated position during the formation of the loop and during the passage of the weft through said loops, the loopers being lowered out of the path of the weft immediately before the next feeding operation. To depress the loopers, each bar is surrounded by a coiled compression-spring 34', extending between a fixed point and a collar or sleeve on the looper-bar.

To effect the formation of a loop, it is necessary that the loopers shall first receive an upward movement to engage the several warps and then a partial rotative movement in order to form a loop, the details of the loop-forming operation being as previously described. To effect the revoluble movement of the looper-bars, a transversely-disposed rack 58 is employed. This rack is supported by the bar 39, and its teeth are at all times in mesh with the teeth of the pinions 33'.

The shaft 52 is provided with a miter-gear 60, intermeshing with a small gear 61 on a longitudinally-disposed shaft 62, mounted in suitable bearings in the upper frame. The shaft 62 carries a mutilated gear 63, which in the present instance is provided with five gear-teeth 64, the remaining portion of the periphery of the wheel being smooth, and at one side of the gear is a flange 65, concentric with the axis of the shaft 62 and interrupted or cut away for a distance equal to the length of the five gear-teeth 64. Arranged parallel with the shaft 62 and mounted in suitable bearings on the upper frame is a shaft 66, having near one end a gear-wheel 67, provided with eight gear-teeth which intermesh with the five teeth of the mutilated gear 63, or the relative number of teeth may be otherwise so arranged that one complete revolution of the shaft 62 shall impart a half-revolution to the shaft 66. At one side of the gear-wheel 67 is a stop-disk 68, having two concaved portions 69 arranged on curved lines corresponding to the curvature of the periphery of the flange 65 and interlocking therewith at the completion of each similar rotative movement of the shaft 66 in order to prevent any further movement until the shaft 62 makes one complete rotation, this mechanism being constructed and operated in a manner somewhat similar to the well-known Geneva stop.

The construction of the parts is shown in detail in Figs. 17, 18, 19, and 20, on reference to which it will be seen that on that side of the large gear-wheel 63 opposite the flange 65 is a lug or tooth 70, adapted to engage in a notch 71, formed in the periphery of the disk 72, carried by the shaft 66. The lug 70 is located at a point slightly in advance of the first of the teeth of the mutilated gear, and in operation the lug and the tooth will act practically simultaneously, the one entering the notch and the other engaging one of the teeth of the pinion, causing rotative movement of the pinion and the stop-disk, and when the latter has completed about half a revolution it will have assumed the position shown in Fig. 18, with the intermediate portion of the disk opposite the spaced portion of the flange 65. Continued rotative movement will bring the parts to the position shown in Fig. 17, with one of the concaved faces 69 of the locking-disk in engagement with the periphery of the frame. At the opposite end of the shaft 66 is a crank-disk 73, having a crank-pin 74, to which is pivotally connected one end of a rod 75, the opposite end of said rod being connected to one arm of a bell-crank lever 76, which is pivoted on a bracket 77, carried by the sill 10. The opposite arm of the bell-crank lever is connected by a pitman 77 to the rack 58, so that reciprocatory movement may be imparted to the rack without in any manner interfering with the vertical adjustment of said rack.

The tension-board 15, heretofore referred to, is secured to a pair of vertically-disposed arms 78, pivoted at their lower ends to the upper frame members and connected by a plurality of forwardly-extending bars to a central bar 80, the outer end of which carries an antifriction-roller 81, resting on the periphery of a cam 82, carried by the shaft 52, the cam being so shaped that once during each revolution of the shaft the tension-plate is allowed to move forward in order that the loopers shall have sufficient slack to form the loops in the warps and then drawn to the rear to restore the tension to the normal.

Figure 5:
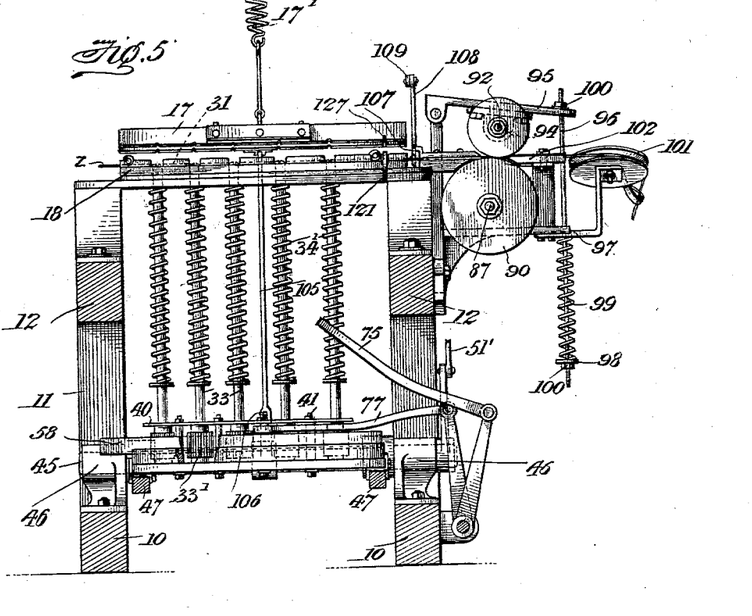
Fig. 5 is a transverse sectional elevation of the machine on the line 5 5 of Fig. 1.
Figures 6, 7:
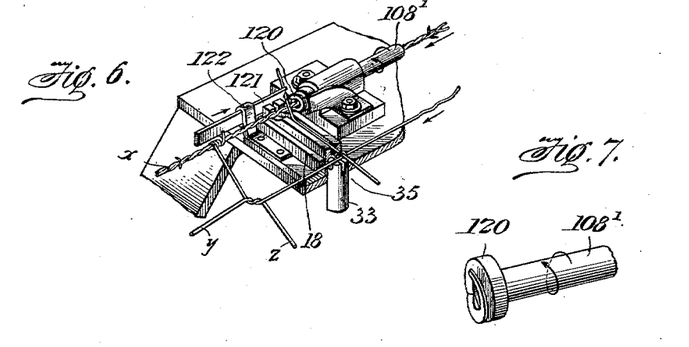
Fig. 6 is a detail perspective view of a portion of the machine, illustrating the construction and operation of one of the twisters.
Fig. 7 is a detail view of one of the twisters.
Figure 22:
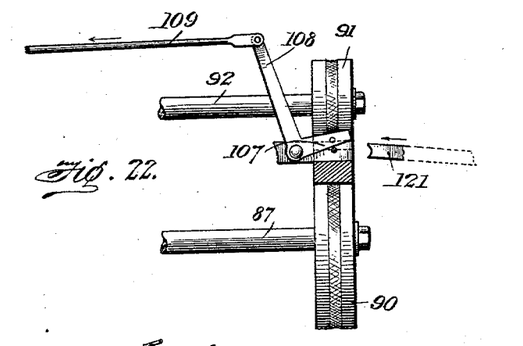
Figure 23:
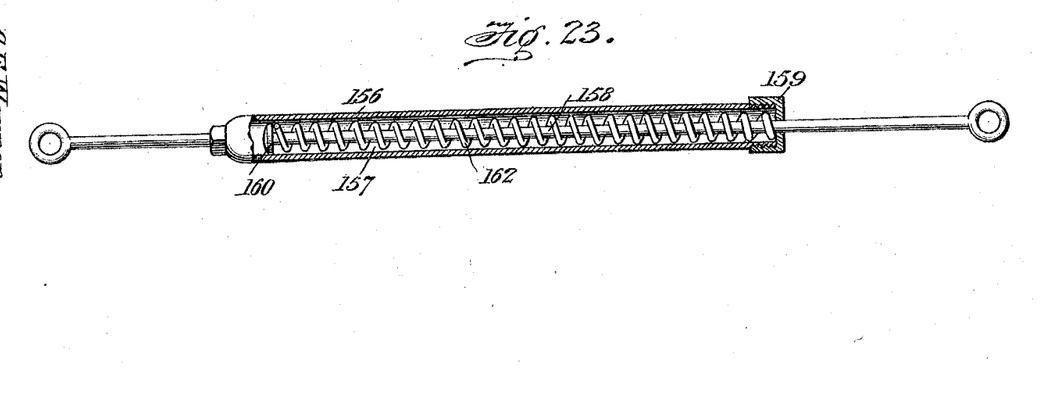
Fig. 23 is a sectional elevation, on an enlarged scale, of a portion of the take-up mechanism.

At the upper portion of the frame of the machine are bearings for the support of a shaft 83, having a pinion 67', intermeshing with a mutilated gear 63' of the character shown in Figs. 17, 18, 19, and 20, the construction here being the same as that of the intermediate gearing connections for transmitting reciprocatory movement to the looper-rotating mechanism. To this shaft 83 is secured a sprocket-wheel 86, and at one side of a frame of the machine are bearings for the support of a longitudinally-disposed shaft 87, provided with a sprocket-wheel 88, a link belt 89 of suitable character connecting the two sprocket-wheels. At one end of the shaft 87 is secured a feeding-roller 90 (see Figs. 5 and 22) for forcing the weft-wire across the shaft or through the warps, this roller acting in conjunction with a secondary feeding-roller 91, mounted on a shaft 92, disposed above and parallel with the shaft 87. The rear end of the shaft 92 is mounted in a loose bearing 93, and its forward end passes through a hanger 94, secured to a bar 95, pivoted at one end to the fixed frame and provided at its opposite end with a depending rod 96, which passes through a guide-opening in the bracket 97 and is provided at its lower end with a head or washer 98, between which and the lower face of the bracket is arranged a helical compression-spring 99, serving to maintain the upper feed-roller in contact with the lower and exert sufficient pressure on the weft-wire to effect the feeding operation. In order that the stress of the spring may be adjusted, the upper and lower ends of the rod 96 are threaded for the reception of adjusting-nuts 100.

The weft-wire is led from a suitable spool around a grooved guiding-roller 101 and enters through a small horizontal guide 102 to the feed-rollers, from whence it is directed through the adjacent grooves on the two bars 17 and 18, being properly guided by said grooves in order that it may enter the several loops formed in the warps.

Between the loop-forming intervals it becomes necessary to elevate the bar 17 in order to permit the pulling of the loops into twists or knots and to allow the free feeding of the warp-wires for a distance sufficient to form a mesh. For this purpose the upper bar 17 is provided with a number of rearwardly-extending arms 103, pivoted to ears 104, projecting from a cross-bar forming a part of the fixed frame, and said bar 17 is connected by a pitman 105 to a crank-arm 106, projecting from the rock-shaft 45, so that at each movement of the rock-shaft to elevate the loopers the bar will be depressed and on the downward movement of the loopers the bar will be elevated to permit the feeding operation.

The length of wire fed across the width of the machine is determined by the gearing connections and the extent of movement imparted to the feed-roll, and after the feeding operation is completed the wire must be severed at a point between the feed-rolls and the bar 17. This is accomplished by means of a cutting-knife 107 on or forming a part of a bell-crank lever 108, having a vertically-disposed arm connected by a rod 109 to one of the arms 78, which support the tension-board, and as the tension-board moves back to tighten the wires the knife is operated and severs the wire at a point in advance of the feed end of the two bars 17 and 18. The cutting mechanism is illustrated more clearly in Fig. 22.

After the completion of a cutting operation it becomes necessary to twist the severed ends of the wire around the selvage cables or wires $x$. The selvage-wires are preferably formed of two or more strands properly twisted together before being fed to the machine and pass through hollow shafts 108', mounted horizontally in suitable bearings carried by the upper frame. The rear ends of the shafts 108' are each provided with bevel-pinions 109', intermeshing with bevel-gears 110. The two bevel-gears 110 are secured at the opposite ends of a transversely-disposed shaft 111, mounted in suitable bearings on the upper frame and provided with a sprocket-gear 112, which is connected by a link belt 113 to a small sprocket-gear 114 on the main shaft 48. The two hollow shafts through which the selvage-wires pass thus receive constant rotative movement at a comparatively high speed, but without effecting any movement of the selvage-wire and without in any manner interfering with the feed. At the end of each of the hollow shafts 108', through which the selvage passes, is a twisting-hook 120, arranged somewhat to the rear of the weft-guiding grooves of the bars 17 and 18, these hooks being adapted to receive the ends of the wefts immediately after the cutting operation in order that the wefts may be twisted around the selvage-wires and properly secured in position. In order to introduce the wefts into engagement with the twisting-hooks, a pair of weft-engaging bars 121 are employed, these bars being guided in small brackets 122, carried by the frame and arranged one immediately outside each of the hollow shafts. One end of each of the feed-bars 121 is pivotally connected to a rocker-arm 123, carried by a rock-shaft 124, extending transversely of the machine and adapted to suitable bearings therein. One of the rocker-arms 123 at the right-hand side of the machine is connected to a longitudinal bar 124', extending from the rocking tension-frame, the members being provided with a plurality of bolt-receiving openings in order that the extent of movement may be properly adjusted. The two weft-engaging bars are maintained in proper position by coiled tension-springs 126, extending between the bars, and a fixed bracket on the upper frame, and any independent lateral movement of said bars is prevented by guiding-slots 127, arranged in the adjacent faces of the bars 17 and 18, through which the weft-engaging bars pass to properly force the ends of the weft into engagement with the twister-hooks, the movement being simultaneous with the weft-severing operation, although the cutting-knife acts slightly in advance of the weft-engaging bars.

In order to produce an intermittent feed of the warp to the end that the weft-wires shall be properly spaced, a lever 140 is pivotally mounted on one end of the shaft 22 and is provided at its upper end with a pawl 143, adapted to engage with the projecting ends of the slats 24, the latter in this case forming, in effect, a ratchet-wheel or annular rack and the successive slats being engaged by the pawl to turn the drum.

On the shaft 52 or to the face of the large gear 51 is secured a crank-pin 144, connected by a rod 145 to the lever 140, the connections being adjustable in order to vary the extent of operative movement of the lever in accordance with the length of the mesh.

The winding-reel 30 at the rear end of the machine is mounted on a shaft 150, and to said shaft is secured a ratchet-wheel 151, with which engages a pawl 152, carried by a weighted bell-crank lever 153, the weight assisting in returning the pawl to an initial position after each feeding movement, and the spring 154 being employed to aid the return movement. On the shaft 52 is secured a crank 155, connected to the bell-crank lever 153 by a yielding connecting-rod 156, and at each rotation of the shaft 52 the pawl 152 causes a partial revolution of the ratchet-wheel. The shaft and the winding-reel carried by said shaft or ratchet-wheel and the reel may be secured together and both removed when the reel is filled in order that an empty reel may be placed in position or the parts may be coupled together in any ordinary manner to transmit the desired rotative movement to the reel.

The connecting-rod may be coupled to the crank at varying distances from the center of rotation of said crank in order to vary the effective stroke in accordance with the character of the fence being manufactured, and said connecting-rod comprises two main members 157 and 158, each provided with an eye at one end for connection to the crank and the pawl-carrying arm. The member 157 is tubular and receives the rod forming the member 158, and mounted on the rod is a perforated cap 159, having internal threads for the reception of the threaded ends of the tube 157, the perforation in the cap-piece forming a guide for the rod 158. At the extreme inner end of the rod 158 is a collar or head 160, which fits within the tube and prevents any excessive lateral play of the two members. On the rod 158 is mounted a coiled compression-spring 162, bearing at one end against the collar 160 or an auxiliary collar formed in the rod and its opposite end bearing against the inner face of the cap 159. This construction permits yielding movement of the rod in case the length of fence taken up by the feed-drum at the opposite end of the machine is less than that equal to the stroke of the crank. If the quantity is less than the length of the crank-stroke, the spring will yield and prevent injury to the take-up mechanism.

In order to regulate the extent of rotative movement of the take-up mechanism in accordance with the gradually-increasing diameter of the body of wire on the reel, we employ a U-shaped bar 165, hung from a bracket 166 on the frame and having one end bearing against the inner face of the body of wire on the reel. The outer arm is connected, by a link 167, to one arm of a bell-crank lever 168, fulcrumed on a pin 169, carried by the frame.

Figure 1:
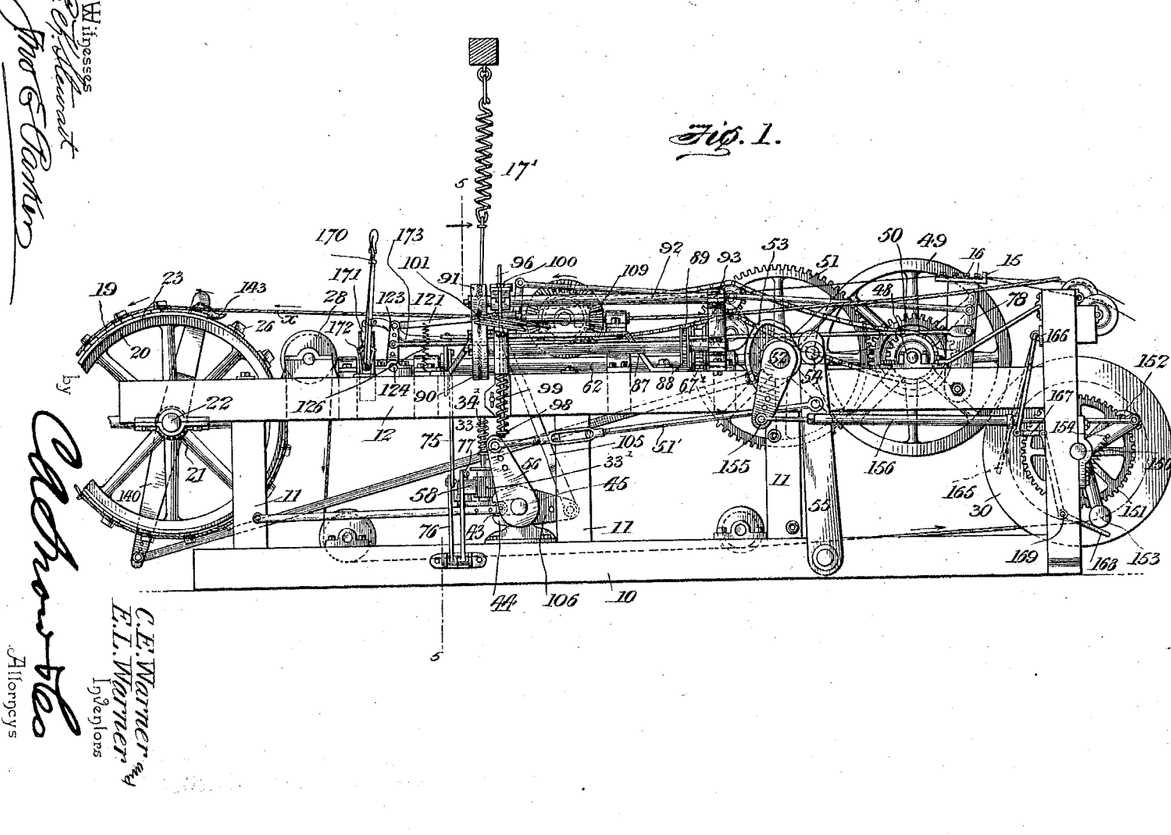
Figure 1 is a side elevation of a wire-fence-making machine constructed in accordance with the invention.
Figure 2:
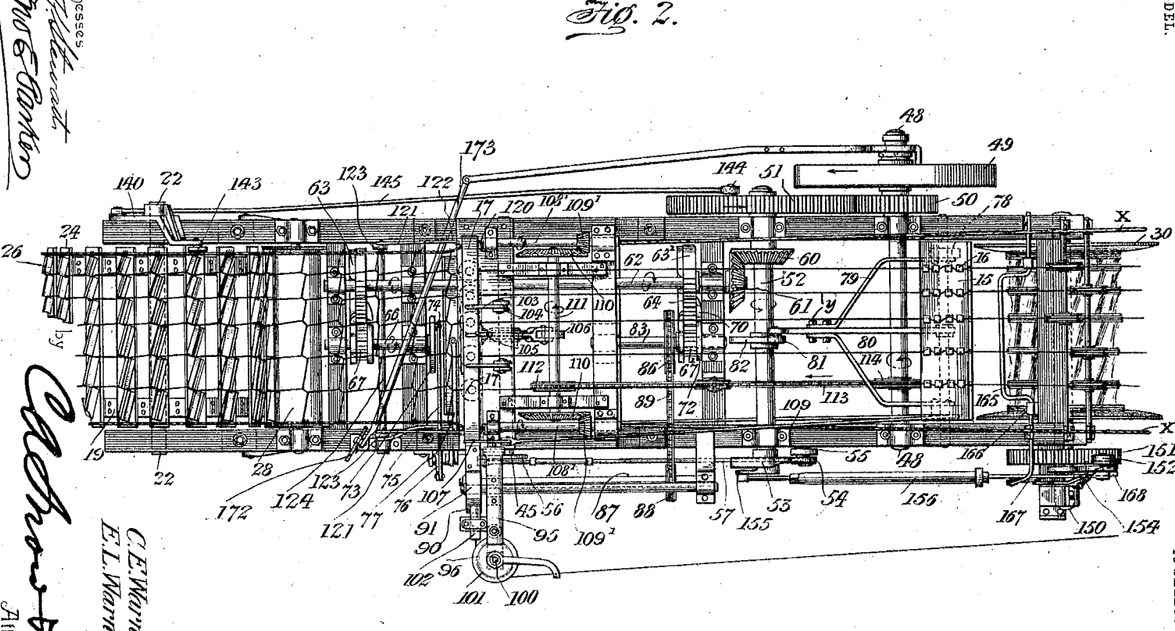
Fig. 2 is a plan view of the same.
Figure 3:
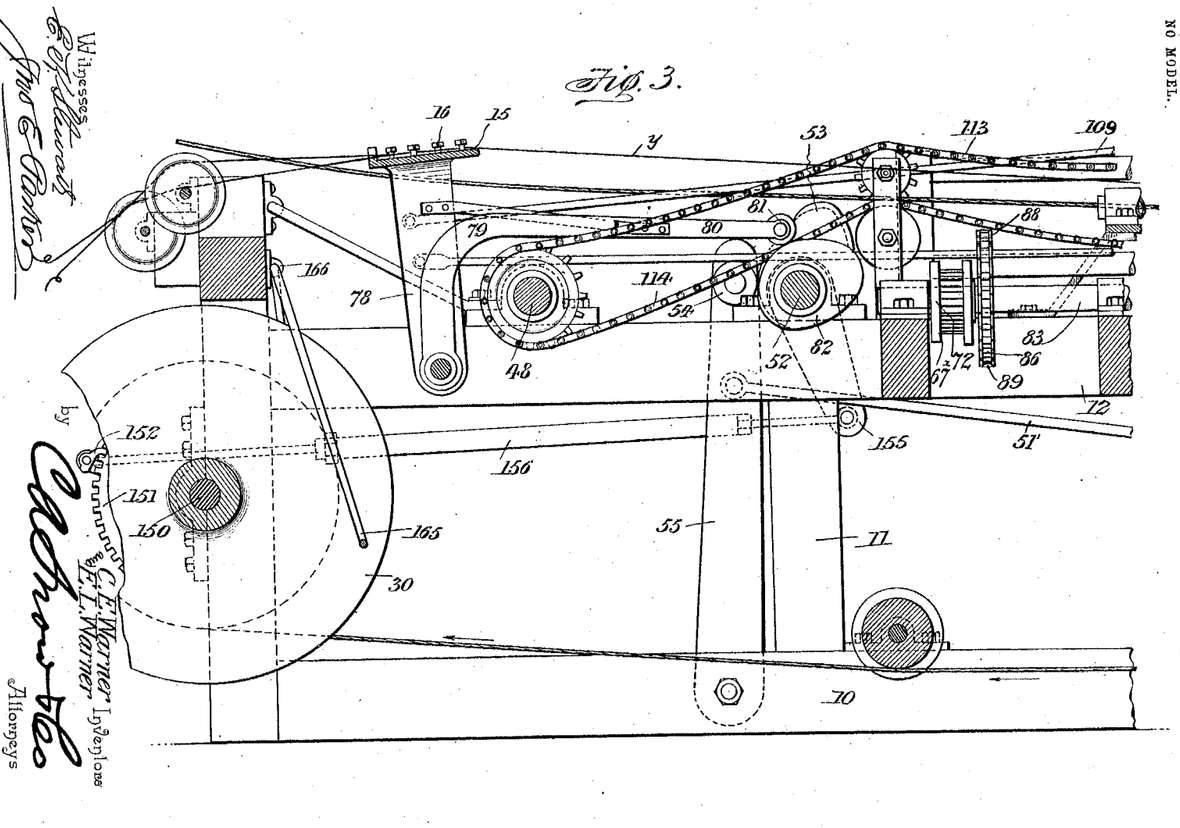
Figs. 3 and 3ª illustrate a longitudinal sectional elevation of the machine drawn to a somewhat larger scale.
Figure 3A:
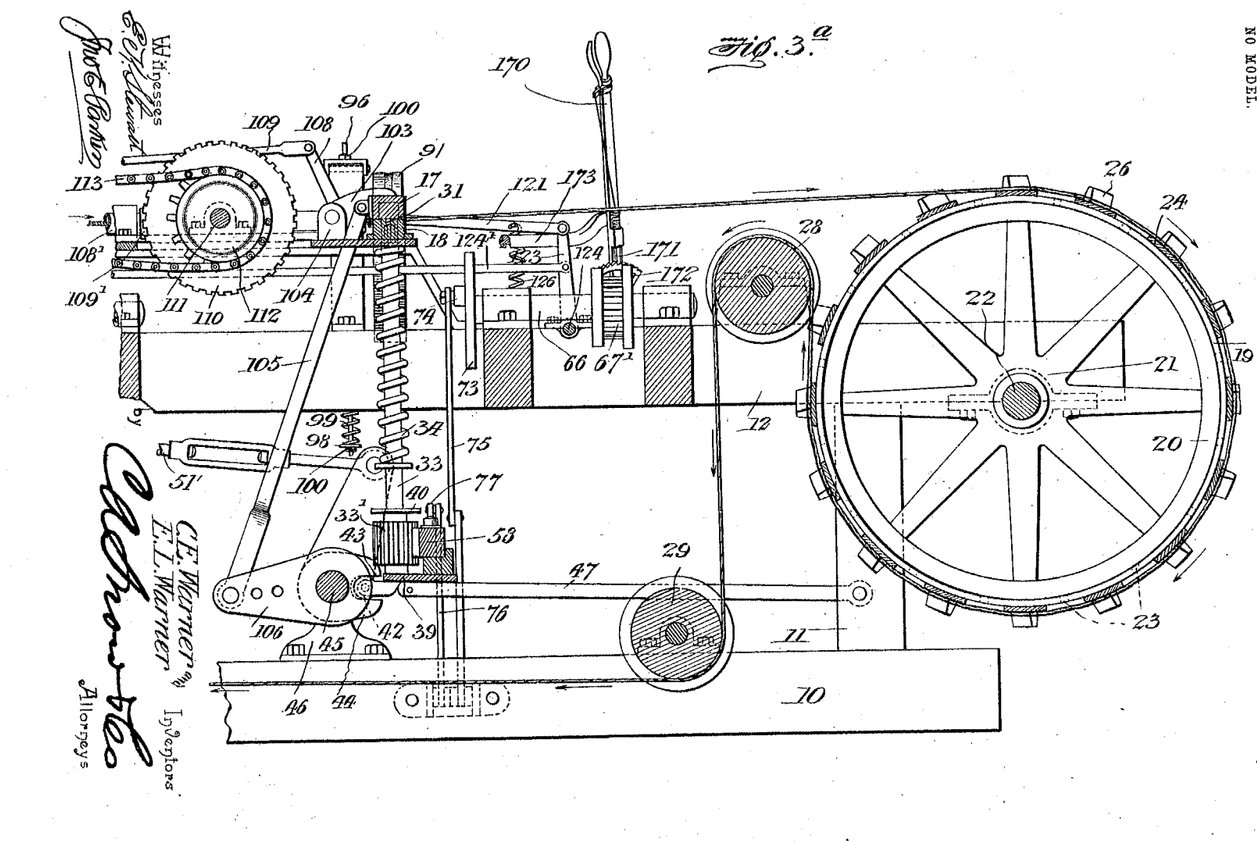
Figure 4:
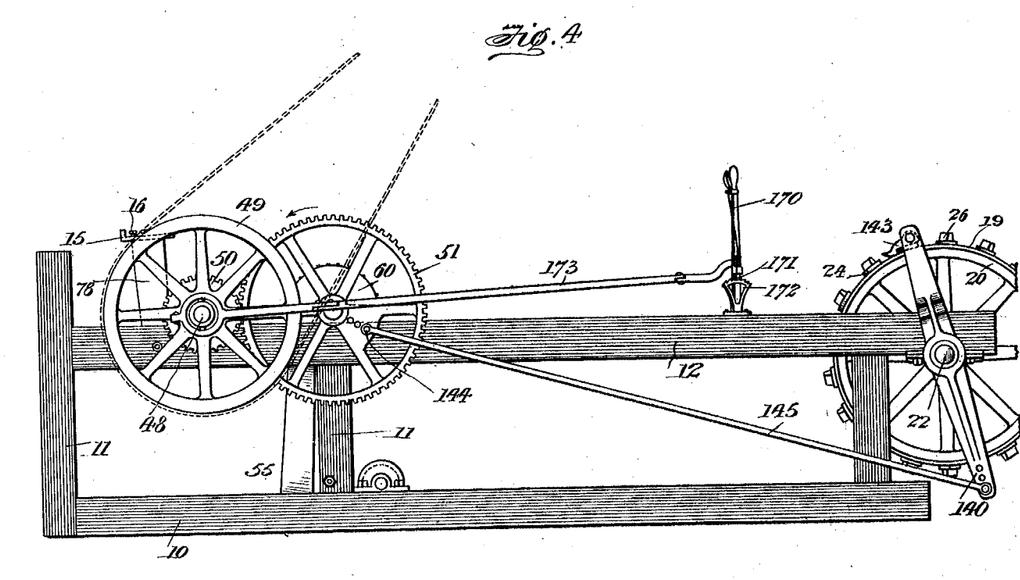
Fig. 4 is an elevation of a portion of the machine looking from the side opposite to that illustrated in Fig. 1, only a portion of the mechanism being shown in order to more clearly illustrate the general arrangement of some of the parts.

The lower arm of the bell-crank lever extends under the weighted end of the bell-crank pawl, carrying lever 153, and on reference to Fig. 1 it will be seen that as the diameter of the body of wire increases the bell-crank lever will be gradually raised, and thus lessen downward movement of the pawl-carrying lever, so that the pawl will gradually shorten its stroke, engaging with fewer teeth each time, and thus lessen the winding movement in proportion to the increased bulk of wire on the reel.

At the operator's side of the machine is a starting and stopping lever 170, provided with the usual latch-bar 171 and locking-segment 172, said lever being connected by a rod 173 to a clutch mechanism of ordinary construction on the main driving-shaft 48.

Figure 16:
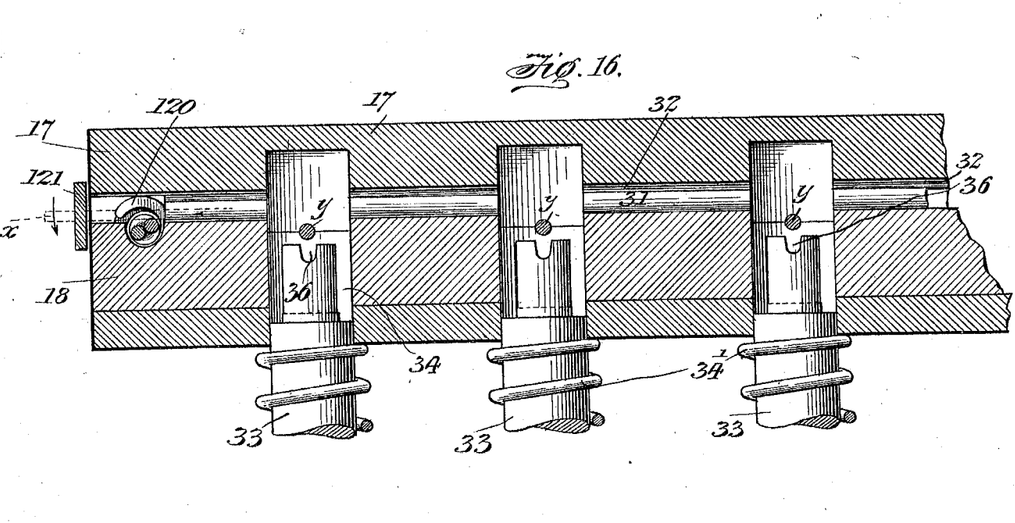
Fig. 16 is an enlarged sectional elevation showing the weft-guiding bars and a number of loopers.
Figures 17, 20:
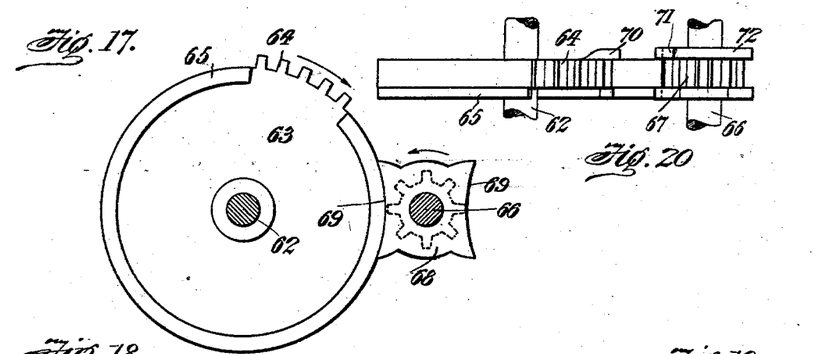
Fig. 17 is an elevation, partly in section, of a portion of the mechanism for transmitting intermittent rotative movement to the loopers and the weft-feeding mechanism.
Fig. 20 is a plan view of the mechanism shown in Fig. 17.
Figure 18:
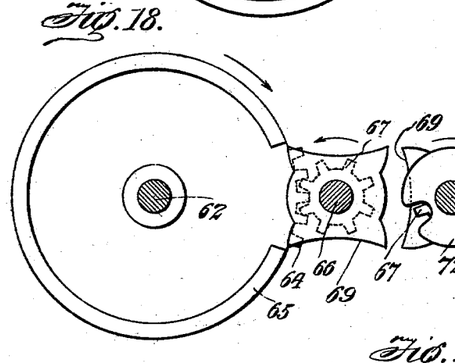
Fig. 18 is a view similar to Fig. 17, the parts being in different position.
Figure 19:
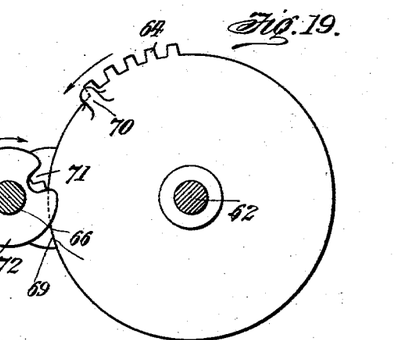
Fig. 19 is an elevation of the mechanism shown in Fig. 17 looking from the opposite side.
Figure 21:
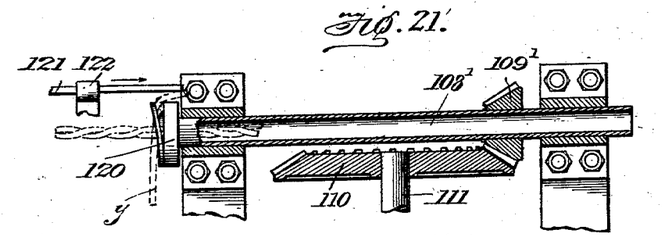
Fig. 21 is a detail view of one of the twisters and its operating mechanism, a portion of the mechanism being shown in section.
Figure 24:
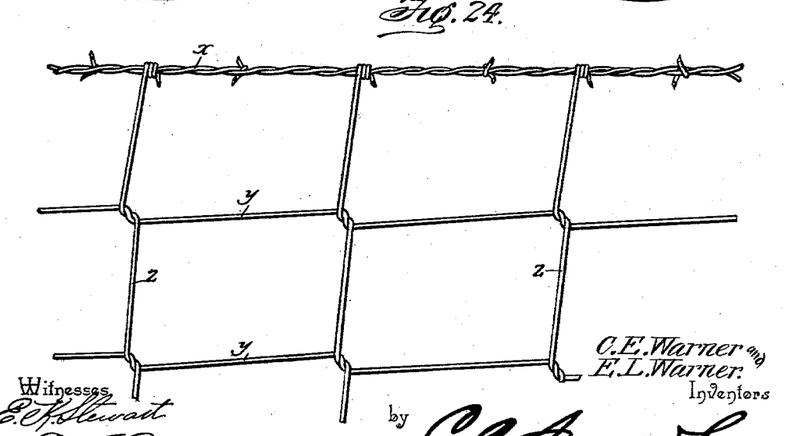
Fig. 24 is a view of a portion of the fence manufactured by the machine.

In the general operation of the machine movement imparted to the rock-shaft 45 draws the upper bar 17 down against the resistance offered by a lifting-spring 17' and at the same time raises the several loopers into engagement with their respective warp-strands. During a portion of the ascending movement of the looper-bars from the position shown in Fig. 9 to that illustrated in Fig. 11 the looper-bars receive movement to the extent of half a revolution and form a loop of the character shown in Figs. 11 and 13. At the completion of this movement the feeding-roller 90 and its mating roller 91 force a weft-strand through the grooves of the two bars 17 and 18 and the corresponding alining loops formed by the several looper-bars. The tension-plate 15 then moves forward and through the bar 109 operates the knife 107 and severs the end of the wire. Immediately following this movement the weft-engaging bars 121 are operated, also by the forward movement of the tension-plate, and force the opposite ends of the weft-wire into engagement with the constantly-rotating loopers 120, the ends of the wire being coiled around the selvage-wires, as shown in Fig. 24. The looper-bars are about this time withdrawn, and the bar 17 is simultaneously raised, while the feeding-drum 19 receives rotative movement and draws the warps forward, changing the several loops into intertwisted or knotted portions, as shown in Fig. 16. Continuation of the feeding movement of the drum draws the wire over the tension-plate, and the latter on returning to its initial position holds the several wires under tension until the next operation. Immediately following or simultaneous with the movement of the feeding-drum the reel 30 is operated to take up the finished fabric.

Figure 25:
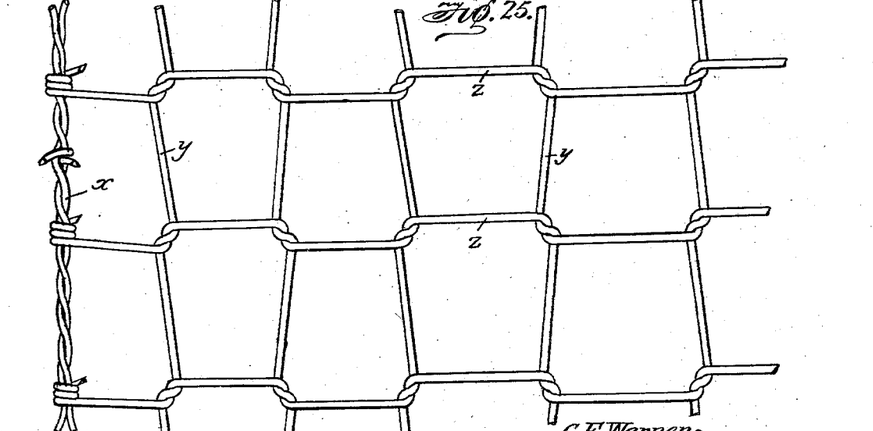
Fig. 25 is a similar view showing a slightly-modified form of fence which may be made by modifying the operation of some of the parts.
Figures 26, 27:
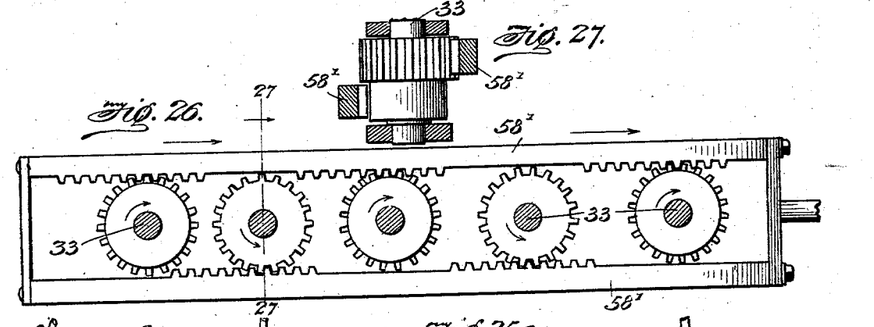
Fig. 26 is a sectional plan view illustrating a modification of a portion of the looper-actuating mechanism employed for the production of the fence shown in Fig. 25.
Fig. 27 is a transverse sectional elevation of the same on the line 27 27 of Fig. 26.

If desired, alternate loopers may receive revoluble movement in opposite directions in order to vary the character of the fence, the result of such operation being illustrated in Fig. 25. To carry on this operation, the pinions of alternate loopers are engaged by oppositely-disposed rack-bars 58', as shown in Figs. 26 and 27.

Having thus described the invention, what is claimed is—

1. In a machine for making wire fabric, upper and lower bars having grooves for guiding weft-strands, one of said bars being provided with notches for engaging the warps, grooved looper-bars having both vertical and rotative movement, said looper-bars having crossing grooves for the reception of both the warps and weft-wires and one of the grooves serving to engage the warps and forming loops therein in alinement with the guiding-grooves of the bars, means for threading weft-strands through the grooves of both the upper and lower bars, the weft-receiving grooves of the loopers and the alining loops, an intermittently-operated feed-drum engaging with the finished fabric, and an oscillating tension device for exerting tensional strain on the warps after the completion of the threading operation.

2. In a device of the class specified, a looper-bar having a pair of grooves crossing each other, one of said grooves being of greater depth than the other.

3. A revoluble and longitudinally-movable looper-bar having a shallow groove extending diametrically across one end of the bar and adapted to engage a warp-wire and twist the same around the bar into loop form, means for imparting longitudinal movement to the bar during the twisting operation, said bar being provided with a deeper groove crossing the shallow groove at right angles and affording a passage for a crossing strand.

4. In a machine for making wire fabric, the combination with warp and weft guiding devices, of a plurality of looper-bars adapted to engage with and form loops in the warp-strands, means for actuating said looper-bars, weft-feeding means, a weft-severing means, revoluble twisters for engaging the ends of the weft-strands to twist the same around the edge of the selvage-wires of the fabric, and means for forcing the end portions of the weft into engagement with the twisters.

5. In a machine for making wire fabric, the combination with warp and weft guiding devices, of looper-bars for engaging with and forming loops in the warps, means for operating the looper-bars, means for threading wefts through the formed loops, means for severing the weft, a pair of constantly-revolving twisters forming guides for the edge of the selvage-wires, and means for forcing the ends of the weft into engagement with said twisters.

6. In a machine for making wire fabric, means for forming loops in warp-strands, means for threading wefts therethrough, means for severing the weft, twister-heads, hollow shafts carrying said twister-heads and forming guides for the edge or selvage wires of the fabric, means for constantly rotating said hollow shafts, and means for forcing the end portions of the wefts into engagement with said twisters.

7. In a machine for making wire fabric, means for forming loops in warp-strands, means for threading wefts therethrough, twister-heads for engagement with the end portions of the wefts, a take-up mechanism for engaging the finished fabric, an oscillating tension-plate for exerting tensional strain on the warp-strands, a weft-severing knife having operative connection with said tension-plate, means for pushing the end portions of the weft into engagement with the twisters, and a connecting means between the tension-plate and the weft-pushing means.

8. In a machine for making wire fabric, means for forming loops in warp-strands, means for threading wefts therethrough, means for taking up the finished fabric, an oscillating tension-plate engaging the warps, twister-heads forming guides for the edge or selvage wires, a pair of guided bars adapted to engage with the end portions of the weft and force the same into contact with the twister-heads, a rock-shaft, rocker-arms carried thereby and connected to said guided bars, means for connecting said rock-shaft to the oscillating tension-plate, and a weft-severing means.

9. In a machine for making wire fabric, the combination with the looper-bars, of pinions carried by said bars, a transversely-disposed bar for supporting said loopers, a rack guided by said bar and intermeshing with the pinions, means for imparting vertical reciprocatory movement to the bar, means for reciprocating the rack, and means for threading wefts through the warp-loops.

10. In a machine for making wire fabric, the combination with the vertically-disposed looper-bars, of pinions carried thereby, a transverse supporting-bar carrying the loopers, guiding-links pivoted at one end to the supporting-bar and at their opposite ends to the fixed frame, a rack guided on the supporting-bar and engaging the several pinions, means for imparting vertical reciprocatory movement to the supporting-bar, an independent operating means for reciprocating the rack, and means for threading weft-strands through the loops of the warp.

11. In a machine for making wire fabric, the combination of the upper and lower warp-guiding bars, pivoted arms carrying the upper bar, loopers extending through guiding-recesses in the lower bar, pinions carried by said loopers, a transversely-disposed supporting-bar carrying all of the loopers, a rock-shaft, arms carried thereby and engaging said transverse supporting-bar, a rocker-arm carried by said rock-shaft and operatively connected to the upper weft-guiding bar, said rocker-arms being arranged opposite each other to effect movements in opposite directions of the weft-guiding bar and the loopers, a rack guided by the supporting-bar and engaging the several pinions, means for reciprocating the rack, and means for threading the wefts through the loops of the warp.

12. In a machine for making wire fabric, the combination of the upper and lower weft-guiding bars, pivoted arms carrying the upper movable bar, loopers extending through recesses in the lower bar, a transversely-disposed looper-supporting bar, pinions carried by the loopers, a rack engaging the pinions, means for reciprocating the rack, a rock-shaft, a rocker-arm carried thereby and engaging the supporting-bar, an opposing arm carried by the rock-shaft and connected to the upper movable weft-guiding bar, a revoluble shaft, a cam thereon, a pivoted lever, an antifriction-roller carried thereby and engaging the cam, a crank-arm connected to the rock-shaft, and a rod extending between the crank-arm and the pivoted lever, substantially as specified.

13. In a machine for making wire fabric, the combination with warp and weft guiding means, of vertically-disposed looper-bars, springs carried by the bars and serving to move the same in one direction, a transversely-disposed looper-supporting bar, pinions carried by the loopers, an auxiliary transverse bar having openings for the passage of the loopers and serving to hold the pinions in position, guiding-links pivotally connected at one end to the transverse bar and at their opposite ends to a fixed point, antifriction-rollers carried by the transverse bar, a rock-shaft, slotted rocker-arms carried by the rock-shaft and receiving the antifriction-rollers, means for actuating the rock-shaft, a rack guided by the supporting-bar and engaging the several pinions, and means for reciprocating said rack.

14. In a machine for making wire fabric, the combination with the loopers, means for effecting a longitudinal reciprocatory movement of said loopers, pinions carried by the loopers, a rack engaging the pinions, a revoluble shaft, means for operatively connecting said shaft to the rack, a driving-shaft, a mutilated gear carried by the driving-shaft and provided with a flange coextensive with the smooth portion of the gear, a lug carried by said mutilated gear, a disk carried by the revolving shaft and provided with oppositely-disposed curved recesses adapted to fit against a flange to thereby lock said revolving shaft at intervals, and a secondary notched disk carried by said revoluble shaft and adapted to be engaged by the lug of the mutilated gear.

15. In a machine for making wire fabric, the combination with means for forming loops in warp-strands, of weft-guiding means, a revoluble weft-engaging roller, a secondary roller arranged adjacent thereto, a pivoted bar supporting said secondary roller, and a spring having an operative connection with the bar and adapted to force the secondary roller into engagement with the revoluble roller.

16. In a machine for making wire fabric, a weft-feeding means comprising a driven roller, a secondary roller arranged adjacent thereto, a pivoted bar having a bearing for the support of the secondary roller, a bracket, a threaded rod passing through openings in the bar and the bracket, a spring mounted on said rod, and a nut adjustably secured on the threaded end of the rod, substantially as specified.

17. In a machine for making wire fabric, a roller-shaft, a roller mounted thereon, a ratchet-wheel on said roller-shaft, a pawl-carrying bar pivoted at a point concentric with the shaft, a pawl carried by said bar and engaging the teeth of the ratchet-wheel, a revoluble shaft, a crank carried thereby, and a yieldable connecting-rod extending between the crank and the pawl-carrying bar.

18. In a machine for making wire fabric, a roller-shaft, a roller supported thereby, a ratchet-wheel on the said roller-shaft, a pawl-carrying bar mounted concentric with the shaft, a pawl carried by the bar and engaging the teeth of the ratchet-wheel, a revoluble shaft, a crank carried thereby, and a two-part connecting-rod extending between the crank and the pawl-carrying bar, said rod comprising a pair of telescopic members and the spring forming a yielding connection between said members.

19. In a machine for making wire fabric, a roller-carrying shaft, a roller supported thereby, a ratchet-wheel carried by the shaft, a bell-crank lever mounted concentric with the shaft, a pawl carried by said lever and engaging the teeth of the ratchet-wheel, a pivoted rod having a depending arm in contact with the fabric on the reel, and a movable stop-lever connected to said rod and regulating the effective movement of the pawl-carrying lever.

20. In a machine for making wire fabric, a reel-shaft, a reel carried thereby, a ratchet-wheel mounted on the reel-shaft, a weighted pawl-carrying lever, a pawl carried thereby and engaging the teeth of the ratchet-wheel, a pivotally-mounted stop-lever adapted to engage with and limit the return movement of the pawl-carrying lever, a two-armed rod pivoted to the frame and having one arm engaging with the fabric on the reel and the opposite arm of said rod being operatively connected to the stop-lever.

In testimony that we claim the foregoing as our own we have hereto affixed our signatures in the presence of two witnesses.

CHARLES E. WARNER.
EUGENE L. WARNER.

Witnesses:
J. W. JAMES,
P. C. PETERSEN.